Sept. 2, 1952     H. M. GEYER ET AL     2,609,054
TWO-SPEED ENGINE COOLING FAN
Filed March 23, 1946     5 Sheets-Sheet 1

INVENTORS
HOWARD M. GEYER
BY HOWARD CARSON
Spencer, Hardman & Fehr
THEIR ATTORNEYS

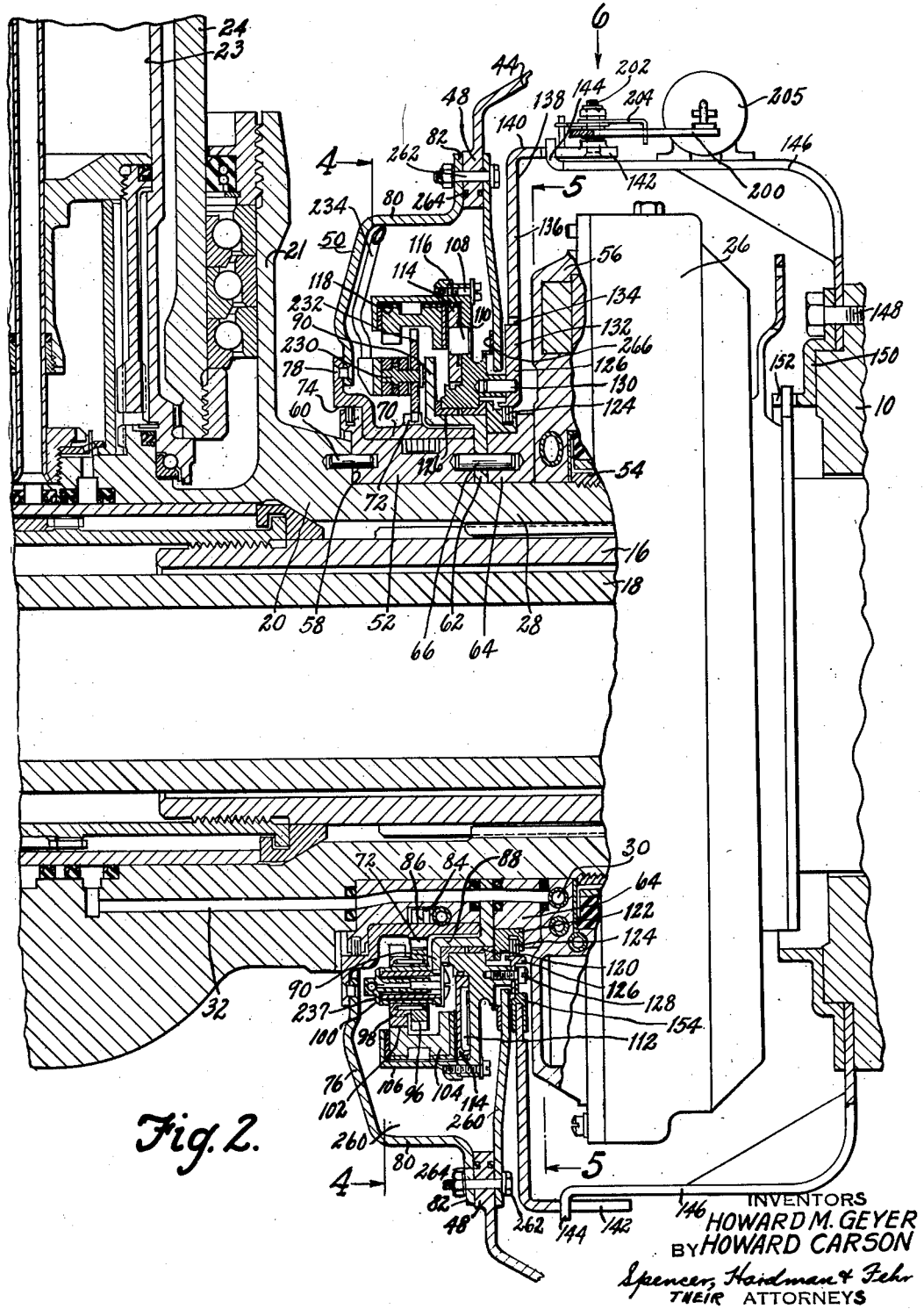

Sept. 2, 1952 H. M. GEYER ET AL 2,609,054
TWO-SPEED ENGINE COOLING FAN
Filed March 23, 1946 5 Sheets-Sheet 3
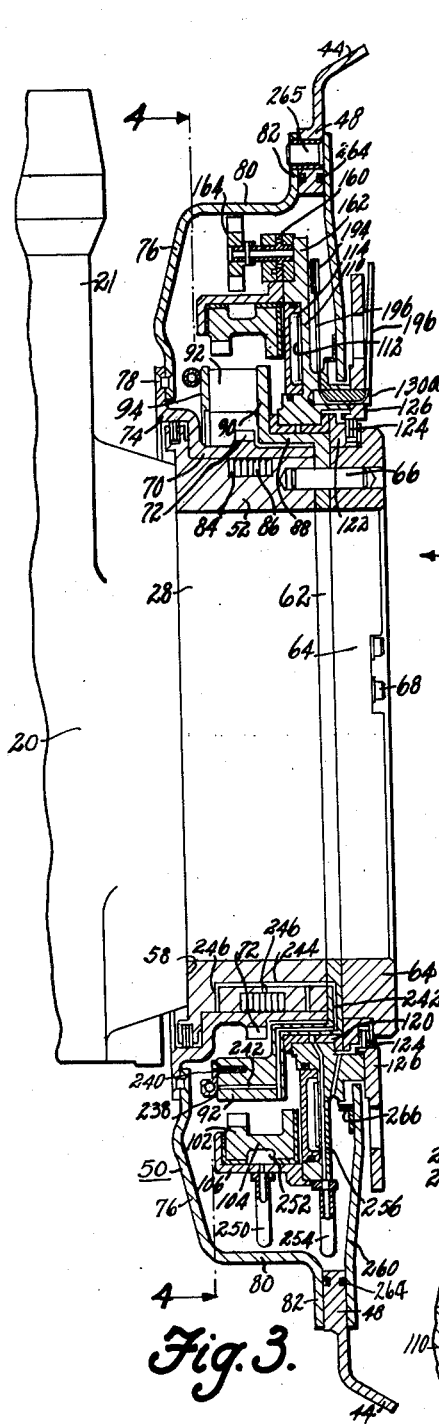
Fig. 3.
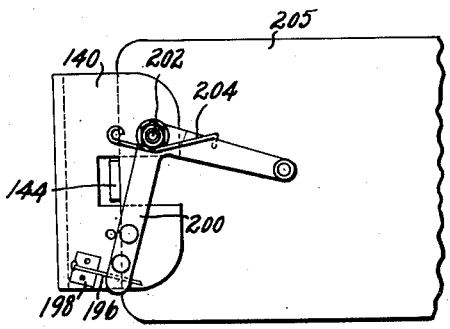
Fig. 7.
Fig. 6.
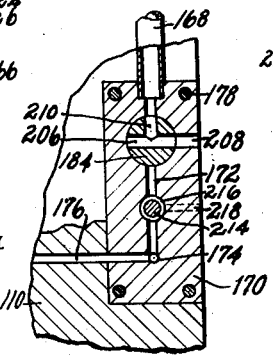
Fig. 9.
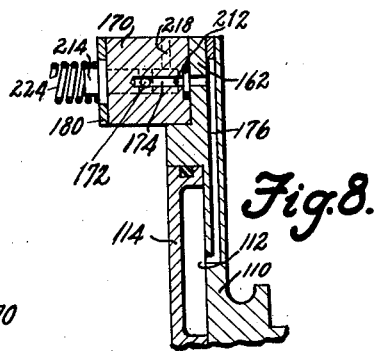
Fig. 8.
INVENTORS
HOWARD M. GEYER
BY HOWARD CARSON
Spencer, Hardman & Fehr
THEIR ATTORNEYS INVENTORS
HOWARD M. GEYER
BY HOWARD CARSON
Spencer, Hardman & Fehr
THEIR ATTORNEYS Patented Sept. 2, 1952

2,609,054

UNITED STATES PATENT OFFICE 2,609,054

TWO-SPEED ENGINE COOLING FAN

Howard M. Geyer and Howard Carson, Dayton, Ohio, assignors to General Motors Corporation, Detroit, Mich., a corporation of Delaware Application March 23, 1946, Serial No. 656,719

17 Claims. (Cl. 170—135.743)

1

This invention relates to cooling of engines of aircraft, and particularly to those propelled by contrarotating propellers or others where there is a deficiency of air movement around the hub of the propeller, and insufficient air movement to satisfactorily cool the driving engine.

One object of the invention is to provide an engine cooling fan that may be driven at more than one speed, in order to suit different conditions of operation.

Another object of the invention is to provide an engine cooling fan drive of more than one speed with means for selecting the speed at which the fan is to be driven.

Another object of the invention is to provide an engine fan drive of the type described, that embodies a complete self-contained unit adapted to be mounted on and disconnected from a propeller installation as such.

Another object of the invention is to provide an engine cooling fan that may be driven either at propeller speed or at a considerably increased speed over the propeller speed, with means for selecting the speed at which the fan is to be driven.

Yet another object of the invention is to provide an engine cooling fan for a controllable pitch propeller that may be assembled and operated without interfering with the pitch control mechanism.

Further objects and advantages of the present invention will be apparent from the following description, reference being had to the accompanying drawings wherein a preferred embodiment of the present invention is clearly shown.

In the drawings:

Fig. 2 is an enlarged view in section taken substantially axial of Fig. 1, it being a view substantially as indicated by the line and arrows 2—2 of Fig. 4.

Fig. 3 is a sectional view taken substantially at right angles to Fig. 2, as indicated by the line and arrows 3—3 of Fig. 4.

Fig. 6 is a plan view of the controller for the fan drive substantially as indicated by the arrow 6 in Figs. 2 and 5.

Figs. 7, 8 and 9 are details in section of the fluid circuit by which speed selection of the fan drive is effected.

Figures 1, 1A:
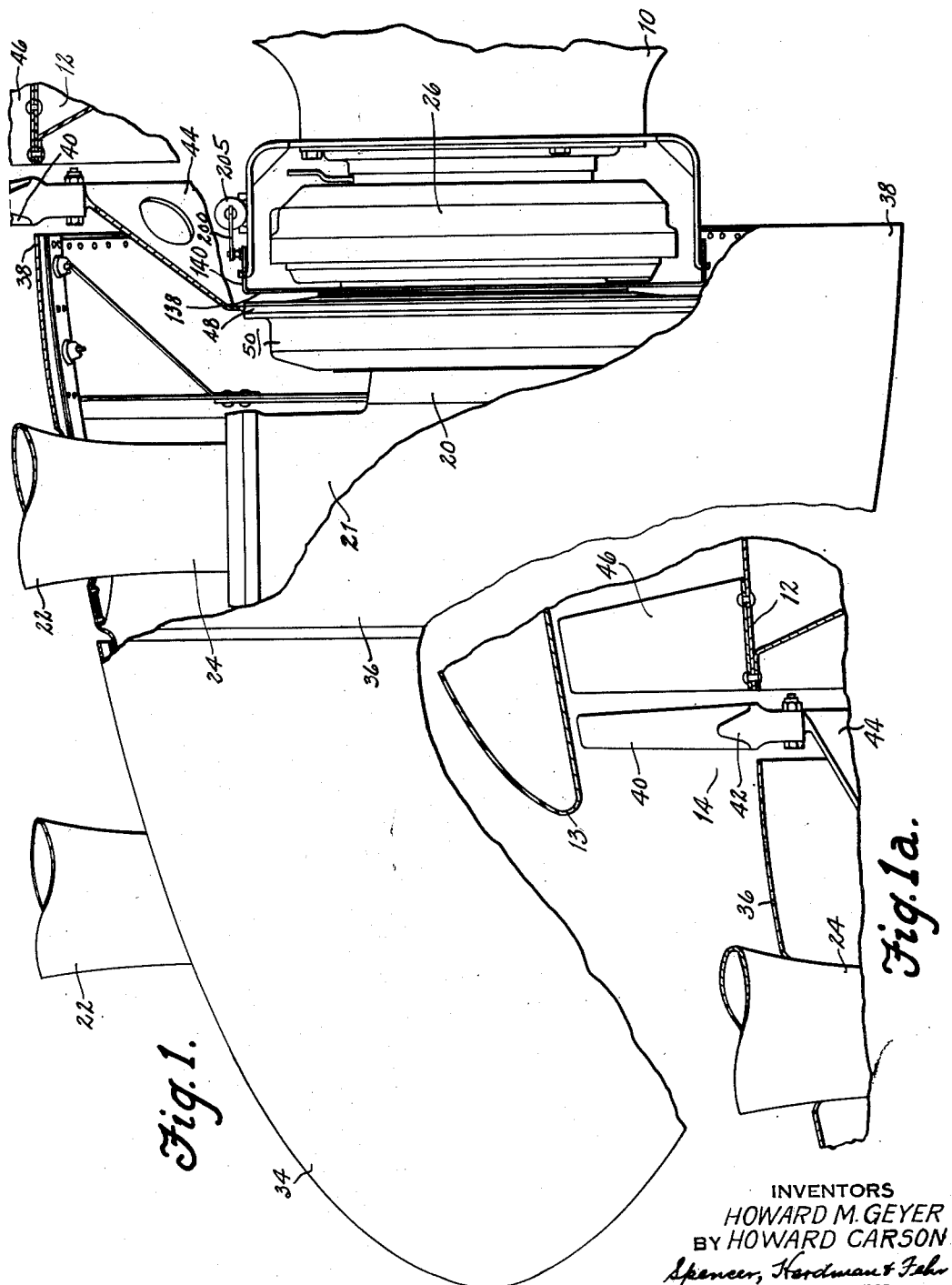
Fig. 1 is an elevational view of a contrarotating propeller with parts broken away and shown in section, illustrating the instant invention.
Fig. 1a is a fragmentary view in enlarged scale illustrating certain features of the invention.

In aircraft propelled by propellers of relatively large blade area and driven by engines of the explosive type the blades of the propellers have little effect of air movement in the region of juncture of blades and hubs. That is because the propellers are designed to be shiftable in pitch during flight and usually have cylindrical or nearly cylindrical shanks radially outward of a spinner base so as not to introduce unwanted effects at any pitch angle of the blade. Large propeller blades are frequently driven by the engine through a speed reduction gearing which also reduces the amount of air movement around the hub of the propeller. If the increase area of blades is accomplished by increasing the number of blades, or by adding another propeller rotating in the opposite direction, then the hub area of the propeller assembly is more nearly filled up by blade shanks and leaves little space left for passage of air to an aft mounted engine all of which tends to deprive the engine of sufficient air for cooling purposes. When the craft is resting on the ground with the engine running there is need of considerable amount of air for cooling the engine, and since the craft is not moving so as to take advantage of the slip-stream there is danger of injury to the engine unless an auxiliary source of air is provided. When the craft is flying at a high rate of speed the slip stream may be sufficient to effect cooling such that a lesser volume of air from the auxiliary source is needed. Great engine loads attended with slower craft movement may demand an increased volume from the auxiliary source. While flight is maintained at very high altitudes, or in sub-zero conditions, the full output of the auxiliary source may effect undue cooling of the engine for its greatest efficiency. It therefore becomes desirable to provide an auxiliary source of cooling air that can be controlled to the needs of the installation for operation at greatest efficiency.

With the foregoing objects and problems in mind the instant invention comprehends the structural development exhibited by the drawings and described in the following pages where 10 refers to a gear casing or other engine structure terminating near one end of the fuselage or body of the aircraft adjacent the station for propeller mounting, being surrounded by shroud means 12 with radially spaced cowl means 13 leaving an annular open space 14 forming an entrance to an airduct leading to the engine to be cooled. Extending from the engine support 10 there is a propeller shaft or shafts 16 and 18 drivingly connected to a hub 20 of a propeller having radially extending sockets 21 for blades 22 that are shiftable in a pitch angle sense by fluid operated motors 23 enclosed within each blade shank 24. Control of the pitch shifting movements of the blades is effected by means of a self-contained hydraulic regulator 26 mounted on a rear extension 28 of the propeller hub and having fluid connections by passages 30 and 32 with the blade motors 23, all in substance as disclosed by the patents to Blanchard et al. Nos. 2,307,101 and 2,307,102, which are directed primarily to mechanism for maintaining substantially constant speed propeller operation. If the propeller installation is one of the dual type the propeller shaft 18 is drivingly connected to a second hub having sockets and pitch shiftable blades substantial duplicates of those already described. However, the second propeller may rotate in a reverse direction to the first propeller and be separately controlled or coupled with the first propeller control mechanism in the manner disclosed in the patent to Blanchard et al. No. 2,362,444. In such case, the hub and roots ends of the blades are enclosed by a spinner for fairing purposes and may include a conic portion 34 and a truncated portion 36, the base end 38 terminating in close proximity to the shroud means 12 to the aircraft enclosure and thus is inwardly spaced from the ring cowl 13 through the amount of the spacing 14.

Sweeping the spacing 14 there is a series of fan blades 40 supported by a ring 42 secured on a driving disk 44 concentric with the propeller shaft and so that the ends of the blades 40 will stop within the inner diameter of the ring cowling 13. The blades 40 are given a desired fixed pitch on the ring 42 and reaction vanes 46 are secured across the spacing 14 behind the blades which tend to straighten out the blast from the fan blades. The driving disk 44 ends inwardly in a planar flange 48 for mounting on a multi-speed fan drive unit 50 mounted on the rear hub extension 28 of the propeller.

The fan drive unit is shown in section in Figs. 2 and 3, and comprises a mounting ring 52 closely embracing the hub extension 28 where it is rigidly secured in driving relation with the hub by a sleeve nut 54 threaded upon the hub extension and forcing a part 56 of the regulator 26 toward the hub of the propeller thereby clamping the mounting ring 52 against a shoulder 58 joining the hub to the hub extension. The mounting ring is prevented from turning upon the hub extension by a locating dowel or dowels 60 fitted in aligned holes or recesses of the ring 60 and shoulder 58. The mounting ring 52 is the main structural element for the fan drive, cooperating with a flanged ring 62 as a planet spider or carrier and with a spacing ring 64 which are held in aligned relation by dowels 66 and screw devices 68 to form an inner ring assembly filling the axial space between the regulator 26 and hub shoulder 58. Journalled for relative rotation on the mounting ring 52, there is a sleeve 70 providing a sun gear 72 and which has an offset flange 74 to which a housing shell 76 is secured by rivets or the like 78. The housing 76 providing an outer cylindrical wall 80, terminating in a flange 82, adapted to engage the flange 48 of the driving disc as will presently be explained. In an annular recess 84 of the mounting ring, there is disposed a spring device 86 that affords a free wheeling drive between the mounting ring 52 and the sleeve 70 and is so characterized that the sleeve 70 will always rotate as fast as the mounting ring 52, but may be rotated at a speed in advance of the propeller speed.

The flanged ring 62 has a cylindrical portion 88 extending over a portion of the sleeve 70 and a radially extending portion 90 interrupted at equally circumferentially spaced points by webs 92 securing a keeper ring 94 as shown in Fig. 3. Within the pockets thus defined by the flange 90, the keeper ring 94 and the webs 92, there are journalled planet gears 96 adapted to intermesh with the sun gear 72 of the sleeve 70. In each instance, a second planet 98, connected in driving relation with planet 96 and rotatable upon the same support 100, meshes with a ring gear 102 carried by a floating ring 104. The floating ring 104 is circumscribed by a channel member 106 secured at its periphery by screw devices 108 to a plate 110 providing an annular piston chamber 112 containing an annular piston 114 adapted to engage one end of the floating ring 104. An appropriate dowel 116 maintains alignment and prevents cocking of the piston within the chamber. Friction increasing elements 118 are provided between the floating ring 104 and the ring 106 and piston 114 such that expansion of the chamber 112 will so grip the ring 104 as to prevent relative rotation between the ring and the cage supporting it. The inner bounds of the ring 110 are provided with bearing members 120 by which the ring is journalled upon the cylindrical portion 88 of the ring 62 which is maintained in rotatable relation by a seal ring 122 disposed between the spacer 64 and the ring 62, the sealing ring supporting a compressible seal element 124 engageable with a driving ring 126, secured to the ring 110 by screw devices 128 and dowels 130. The driving ring 126 provides a pair of diametrically disposed prongs or lugs 132 that engage within similarly disposed notches 134 of a transmission ring 136 having diametrically radially disposed arms 138 which end in rearward axially disposed plates 140, each notched at 142 for reception of lugs 144 of a bracket member 146 secured to the end support 10 by screw devices 148 which may be the same as screw devices that retain a driving plate 150 for tongue and notch engagement at 152 of the adapter assembly by which the mechanism of the regulator 26 is operated.

This connection affords in substance an Oldham coupling for retaining the floating ring cage in substantially fixed relation with respect to the support structure 10, since the diametrically disposed tongue and notched relations 132 and 134 are situated 90° from the notch and lug provisions 142 and 144. The bracket 146 along with the axially extending plates 140 of the transmission ring embrace and are radially spaced from the regulator 26 such that rotation of the regulator by the propeller will not interfere with the support of the floating ring cage.

The mating relation of the rings 126 and 136 at the lug and notch provisions 132 and 134 is maintained by U-clips 154 secured to the ring 126 by the screws 128 and embracing the inner periphery of the ring 136 such that the ring 126 is maintained against axial displacement with respect to the ring 136.

Means are provided for hydraulically actuating the piston 114 with respect to the rings 110 and 104 and comprise a gear type fluid pump 160 mounted on a peripheral portion 162 of the ring 110, one gear of which is driven by an impeller 164 so that the pump will move liquid from a scoop 166 through appropriate passages to a delivery pipe 168 to a valve unit 170 and thence by passages 172, 174, 176, to the chamber 112 behind the piston 114 substantially as is shown in Figs. 7, 8 and 9. The valve unit 170 affords a block providing the passages 172 and 174 which block is mounted on the portion 162 by means of screw devices 178 that also retain a cover plate 180 apertured to pass a pilot 182 of a rotary valve plug 184 disposed in a cross bore of the block intersecting the passage 172, the pilot having an offset or radially disposed arm 186 joined to a helical spring 188 in turn secured to the pump casing at 190. The valve plug 184 has a flange 192 adjacent to the pilot 182 that is disposed in a recess around the valve bore and covered by the plate 180, so as to permit rotary movement of the valve but prevent axial movement thereof. The opposite end of the valve plug is fitted with a pulley 194 secured in which there is a flexible wire or cable 196 that is so anchored and trained over the pulley as to pass radially inward through guideways in the inner bounds of the ring 110 and locating dowel 130a to the outside of the fan unit. From that point the cable 196 trains outwardly through one of the plates 140 and over a guide piece 198 to be anchored to one arm of a bellcrank 200 pivoted at 202 to the plate 140 and retracted by a spring 204. The other end of the bellcrank couples with linkage to a solenoid 205 or other actuating device by which the bellcrank may be selectively actuated to pull or release the cable 196.

Extending across the valve plug so as to be in alignment with the ends of the passage 172 when the cable is actuated by the bellcrank, there is a drillway 206 that normally connects with a port 208 in the block 170. A short passage 210 extends from the drillway 206 to the surface of the valve plug and normally connects the pressure end of the passage 172 with the port 208 when the valve plug is in the rest position or when the cable is relaxed. A pull upon the cable 196 operates to rotate the valve plug counterclockwise from the position shown in Fig. 9 to such position that the port 208 is closed and the passage 172 opened through the drillway 206. That allows the pressure developed by the pump 160 to be conducted from the delivery pipe 168 to the piston chamber 112 by way of the passages 172, 174 and 176. Should the potential of pressure become too great it exerts itself through a small bore passage 212 extending from the passage 174 to the back side of a plunger valve 214 occupying a bore intersecting the passage 172. The plunger valve 214 provides an annular groove 216 in line with the passage 172 and about which the fluid under pressure flows on its way to the piston. A relief passage 218 is drilled in block 170 and connects to plunger valve passage between drilled holes 212 and 172, so that pressure on end of plunger valve 214 will cause valve to compress the spring 224 against the spring bracket 226 and open back pressure port 212 to relief opening 218 through plunger passage 216. This causes the maximum pressure in brake cylinder 212 to be determined by the precompression of the spring 224. When plunger valve is moved axially and spring compressed the annular groove 216 and pump line 168 become disconnected and pump outlet is closed, the pump then is running at maximum pressure and the impeller wheel 164 is slipping in driving fluid contained in reservoir made up of parts 80, 50, 260.

Figure 4:
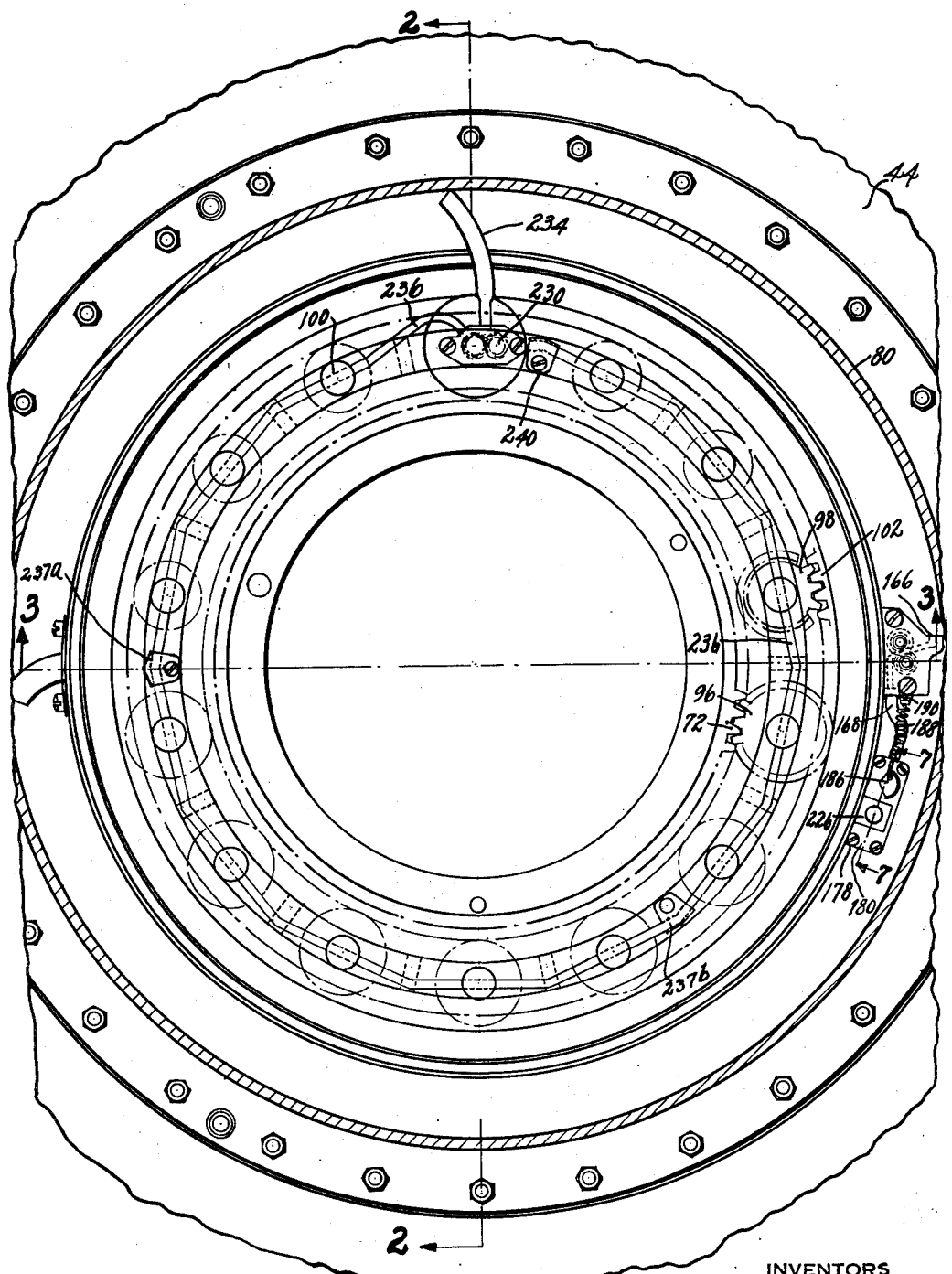
Fig. 4 is a transverse sectional view through the fan drive unit substantially as indicated by the line and arrows 4—4 of Figs. 2 and 3.
Figure 5:
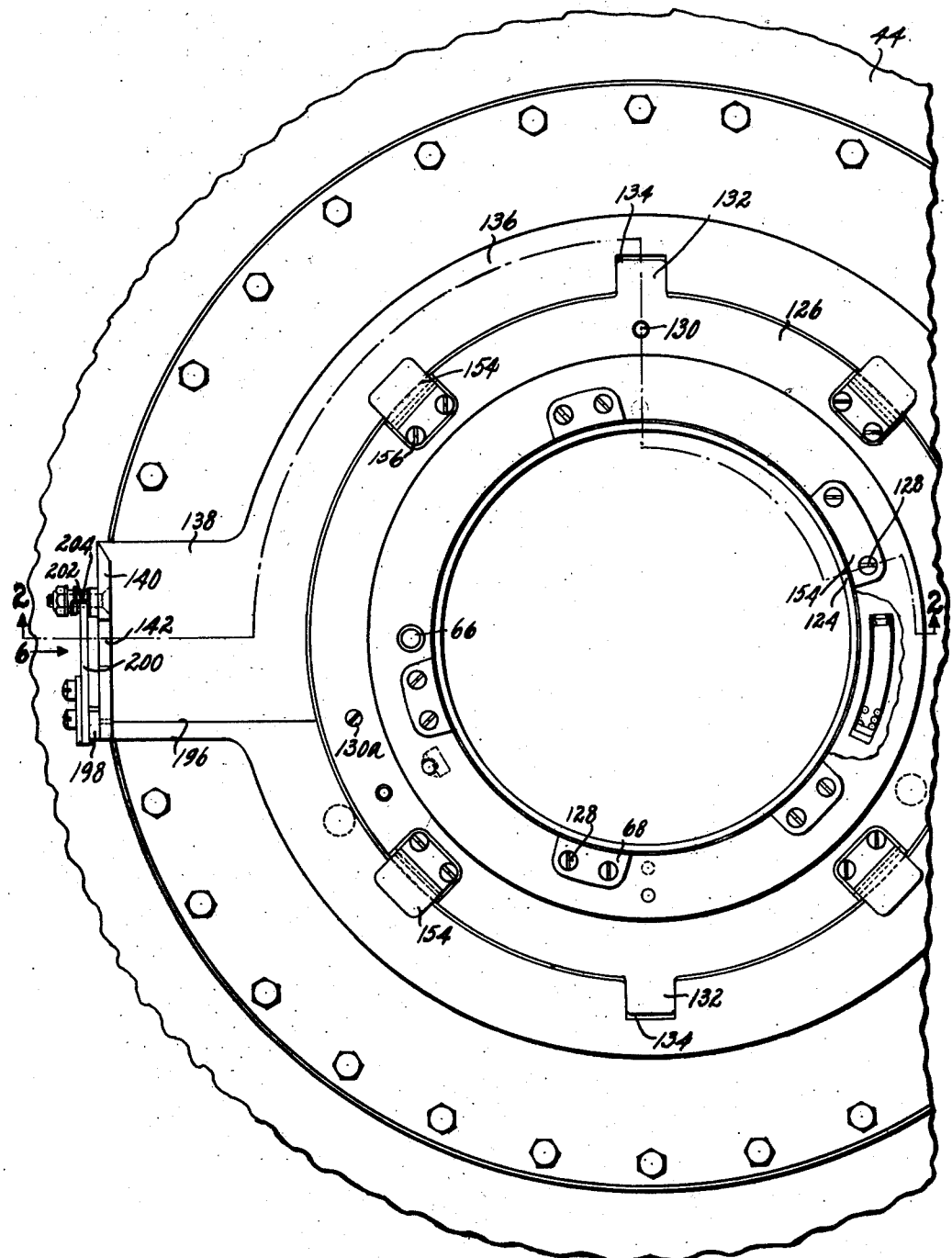
Fig. 5 is a view in end elevation of the fan drive unit substantially as indicated by the line and arrow 5—5 of Fig. 2, and by the arrow 5 of Fig. 3.

For lubrication purposes a gear pump 230 is mounted on the radial portion 90 of the planet spider, as is shown in Figs. 2 and 4, and so that a driving gear 232 rolls upon the sun-gear 72 to effect movement of fluid from a scoop 234 to an outlet pipage 236 which leads to the bearings or pivots 100 of the planets 96 and 98. Clips 237 are provided at each of the webs 92 for securing the pipage 236 securely to the keeper ring 94 and to lead the pipage around the planet carrier to a point adjacent the pump 230 where it ends in a clip 238 secured to a web 92 by a screw device 240 as is shown in Figs. 2 and 3. Drilled passages 242 are provided in the web and in the portions 92, 88 and 62 of the planet carrier that connect with an axial bore 244 in the mounting 52, while radial bores 246 lead to the surface of the bearing ring adjacent the sleeve 70. The pump and pipage thus affords lubrication under pressure for the bearing of the sun-gear.

A second scoop 250 is mounted on the ring 106 of the cage so as to pick up lubricant and deliver it to an annular groove 252 in the floating ring for lubricating its bearing within the ring channel of the cage. An additional scoop 254 is mounted on the plate 110 which has radially inwardly extending drillways 256 leading to the bearing 120 providing lubrication between the planet spider and ring-gear cage.

The sleeve 70, housing 76 and cover plate 260 form an annular reservoir enclosing the change speed mechanism and is charged with a sufficient quantity of light oil or fluid suitable for actuating the piston 114 and for lubricating the bearings. The cover plate 260 is secured to the periphery of the housing at the flange 82 by means of screw devices 262 which clamp the members 82 and 260 to opposite sides of the flange 48 of the driving disc, seal strips 264 being compressed to avoid fluid leakage from between the parts. A dowel 265 may be used to locate the parts and take the driving thrust of housing 76 for the disc 44. The inner bounds of the cover plate is provided with a slinger ring 266 to prevent or deter escape of the fluid medium to the exterior of the unit. Only a small quantity of fluid is needed within the unit for the successful operation of the parts. While the unit is at rest the fluid will drain to the then existing low point within the reservoir and is never high enough to leak out of the space between the inner ring of the cover plate and the cage ring 110. As soon as the unit is rotated the fluid is thrown against the wall 80 of the reservoir where it is maintained by centrifugal force except as it is picked up by one or another of the scoops 166, 234, 250 and 254. Scoop 166 delivers the fluid to the pump 160 providing a source of pressure for operation of the cylinder and piston in arresting the ring-gear 104. The pump 160 is driven by the blades of the impeller 164 reacting to the flow of the fluid as the reservoir is carried around the fixed cage supporting the pump. The scoop 234 feeds the pump 230 driven by the sun-gear for lubricating the bearing of the unit, while the scoops 250 and 254 lead directly to bearing surfaces for their lubrication.

While the embodiment of the present invention as herein disclosed, constitutes a preferred form, it is to be understood that other forms might be adopted, all coming within the scope of the claims which follow.

What is claimed is as follows:

1. In an aircraft, the combination comprising, a propeller, an engine driving the propeller mechanism for maintaining propeller speed substantially constant, a multi-speed fan unit driven by the propeller for cooling the engine, and manually actuated fluid pressure means for selecting the speed for driving the fan by the propeller.

2. In an aircraft, the combination comprising, a rotating propeller, an engine for driving the propeller mechanism for maintaining propeller speed substantially constant, a multi-speed fan unit driven by the propeller for cooling the engine, hydraulic means for shifting the speed relation at which the fan will be driven by the propeller, and manually actuated means for actuating the shifting means and selecting the speed of fan drive.

3. In an aircraft, the combination comprising, a controllable pitch propeller, including an hydraulic regulator rotating therewith for controlling the pitch setting of said propeller, an engine for driving the propeller, a multi-speed fan unit driven by the propeller for cooling the engine, said fan unit being rotatable with the propeller and providing fluid passages therethrough for transmission of regulator fluid from the regulator, fluid operated means within the fan unit independent of the regulator fluid from the regulator for selecting the speed at which the fan unit will operate, and manually actuated means for controlling the fluid operated means of the fan unit.

4. The combination set forth in claim 3 in which the hydraulic regulator and the fan unit both receive their operating initiative from a fixed part of the aircraft supporting the engine.

5. In an aircraft, the combination comprising, a controllable pitch propeller having a rear hub extension, a hydraulic regulator in driven relation with said hub extension and having fluid operated means for controlling the pitch of the propeller, an engine for driving the propeller, and a multi-speed engine cooling fan unit mounted on the hub extension and disposed between the propeller and the regulator, said fan unit having fluid passages therethrough for connecting the fluid operated means of the regulator with the propeller pitch shifting means, and manually operated means for selecting the speed at which the propeller will drive the fan unit.

6. In a mechanism having a hub with an extension rotating relative to an engine support, a cooling fan which comprises, a planet spider driven by and at the same speed as the hub extension, a fan blade assembly journalled for rotation on the planet spider, an over-running clutch coupling the planet spider and fan assembly so that the fan assembly will be driven at least as fast as the hub extension, a cage fixed against rotation with respect to the engine support and having a relatively rotatable ring-gear, selectively operable means for arresting the ring-gear with respect to the cage, and planetary gear means connecting the fan assembly with the ring-gear whereby arresting of the ring-gear will effect rotation of the fan assembly at a speed in the order of two and one half times the speed of propeller rotation.

7. In apparatus including a hub driven relative to a fixed support, the combination of a fan assembly driven by the hub, in which said fan assembly includes a sun-gear rigidly supporting fan blades, and which is supported through an overrunning clutch by the hub, a planet spider driven by the hub and having planets meshing with the sun-gear, a floating ring-gear meshing with the planets, a fixed cage journalling the ring-gear, and means provided by the cage for selectively arresting the ring-gear that the fan blades may be driven at accelerated speed, or for releasing the ring-gear that the fan blades may be driven at hub speed.

8. In apparatus including a hub driven relative to a fixed support, the combination of a fan assembly driven by the hub, in which the fan assembly includes a planet spider driven at hub speed, planets carried by the spider, a sun-gear with affixed blades capable of rotating in one direction relative to said spider, a floating ring-gear meshing with the planets, a cage loosely supporting the ring gear and having an Oldham coupling with the hub support, and means carried by the cage selectively operable to let the ring-gear run free in the cage, and to arrest the ring-gear with respect to said cage, said ring-gear when running free in the cage effecting rotation of fan blades at hub speed and when arrested with respect to the cage effecting rotation of the fan blades at more than double the hub speed.

9. In apparatus including a hub driven relative to a fixed support, the combination of a fan assembly driven by the hub, in which the fan assembly includes a planet spider driven by the hub extension, a housing rotatably mounted with respect to the spider and having fan blades and a sun-gear, a cage fixed relative to the hub support and providing a floating ring-gear, planets carried by the spider meshing with the sun-gear and the ring gear within the housing, an annular piston carried by the cage for arresting the ring-gear relative to the cage, and fluid pressure means for actuating the piston, for arresting and for releasing the ring-gear relative to the cage.

10. In apparatus including a hub driven relative to a fixed support, the combination of a fan assembly driven by the hub, in which the fan assembly includes a hub driven planet spider, a sun-gear, a floating ring-gear, planet gears intermeshing with both the sun-gear and the ring-gear, a cage fixed relative to the hub support rotatably supporting the ring-gear, a piston carried by the cage adapted to engage the ring-gear, fluid pressure means carried by the cage for actuating the piston, a housing carried by the sun-gear enclosing the cage and gears and forming a reservoir for a fluid medium, and means controlling the application of fluid medium to the piston.

11. In a mechanism rotatable on a support, the combination comprising, a rotor having a rear hub extension, a fan drive unit mounted on the hub extension between the support and the rotor, said fan unit including an annular housing supporting fan blades journalled on the hub extension so as to rotate as fast as the rotor and capable of rotating in advance of the rotor, a spider driven by the hub extension, a cage extending into the housing and fixed against rotation relative to the support, planetary gear means including a floating ring-gear supported by the cage for coupling the housing to the cage, and fluid operated means for clutching and unclutching the ring-gear relative to the cage, whereby the ring-gear may be allowed to rotate with the housing for fan rotation at rotor speed or may be fixed relative to the cage for fan rotation in advance of rotor speed.

12. In a mechanism rotatable on a support, the combination comprising, a rotor having a rear hub extension, a fan drive unit mounted on the hub extension between the support and the rotor, said fan unit including an annular fluid charged reservoir having free wheeling support on said hub extension, an annular piston cage enclosed within the reservoir and having a part extending without the reservoir, means extending from the support to engage the extended part of the piston cage to restrain it against rotation, planet gear means including a floating ring-gear carried by the cage for drivably coupling the cage and reservoir and rotor, a piston and hydraulic means for gripping the ring-gear by the cage, an impeller pump carried by the cage and driven by relative rotation of the reservoir for creating fluid pressure in the hydraulic means, and means operable at a remote point for applying the pressure developed to the hydraulic means or for bypassing the fluid pressure back to the reservoir, said planet system when the ring-gear runs free in the cage driving the reservoir at a predetermined speed, and when gripped by the cage driving the reservoir at a greatly increased speed.

13. In a fan assembly driven by a shaft rotatable on a support, the combination comprising, a planet spider driven by the shaft, planet gears rotatably supported by the spider, a fluid pressure pump carried by the spider, a sun gear journalled on the shaft and engaging the planet gears and the pump driving gear, an overrunning clutch connecting the sun gear with the shaft, a ring gear assembly fixed relatively to the support and engaging the planet gears, an annular housing providing a pair of parallel walls, one of which is secured to the sun gear to form a fluid containing reservoir surrounding the shaft and enclosing the spider and the ring gear assembly, fan blades secured to the outer periphery of the housing, and means operable on the ring gear assembly for selecting one of two speeds at which the sun gear will be driven by the shaft.

14. The combination set forth in claim 13 wherein the ring gear assembly includes an annular ring journalled on the shaft and retained against rotation by brackets secured to the support, means providing an overhanging annular channel surrounding the planetary spider, a floating ring gear disposed in the channel and engaging the planets, means carried by the annular ring and selectively operable for permitting the ring gear to rotate in the channel of the ring, and for arresting the ring gear with respect to said ring, whereby the fan blades are rotated at shaft speed or some accelerated speed greater than said shaft speed.

15. The combination set forth in claim 13, wherein fluid passages connect the pump with the planet gears and with their bearings for lubricating the parts under pressure, and wherein scoops carried by the ring gear assembly supply lubricant for the bearings of the sun gear and the ring gear assembly.

16. The combination set forth in claim 13, wherein the means operable on the ring gear assembly for selecting the speed at which the sun gear will be driven include an annular plate journalled on the shaft, a fluid pressure pump carried by the annular plate and having a fluid scoop ending near the periphery of the reservoir, an impeller wheel adjacent the edge of the reservoir for driving the pump, an annular piston received by an annular channel provided by the annular plate, a floating ring gear disposed adjacent the annular piston, a flanged ring secured to the annular plate for enclosing the floating ring gear, a control valve and fluid passages connecting the output of the pump with the annular piston, and remotely controlled means for actuating the control valve, whereby delivery of pump pressure to the annular piston arrests the ring gear with respect to the support and effects rotation of the planet gears which drive the sun gear and fan blades at an accelerated speed, and whereby return of the pump pressure to the reservoir permits the ring gear to rotate with respect to the flange ring and at the speed of the shaft.

17. In a fan assembly driven by a shaft rotatable on a support, the combination comprising, a sun gear journalled for rotation on the shaft, an overrunning clutch for driving the sun gear at shaft speed and permitting sun gear rotation at accelerated speed, a planet spider rigidly supported by the shaft for rotation therewith, a ring gear concentrically arranged about the planet spider, planet gears mounted on bearings carried by the spider and engaging the sun gear and the ring gear, channel means carried by the support providing a runway for the ring gear, piston means for selectively coupling and uncoupling the channel means to the ring gear so that the ring gear may run free in the channel when uncoupled and may be arrested when coupled, a lubrication pump carried by the planet spider and driven by the sun gear, passage means connecting the pump output with the planet gear bearings, annular housing means with fan blades secured to the sun gear and providing a fluid containing reservoir enclosing the planets, pump, ring gear and channel means, an impeller pump carried by the channel means and dipping into the fluid of the reservoir, and manually controlled means for selectively applying the output of the impeller pump to the piston means for control of the coupling between the channel means and ring gear, the rotation of the housing at either shaft speed or accelerated speed presenting fluid medium at the intake of both the lubricating pump and the impeller pump.

HOWARD M. GEYER.
HOWARD CARSON.

REFERENCES CITED

The following references are of record in the file of this patent:

UNITED STATES PATENTS

| Number | Name | Date |
|---|---|---|
| 2,173,896 | Caldwell | Sept. 26, 1939 |
| 2,225,121 | Lundquist | Dec. 17, 1940 |
| 2,274,743 | Rosskopf | Mar. 3, 1942 |
| 2,347,153 | Hagen et al. | Apr. 18, 1944 |
| 2,401,496 | Mercier | June 4, 1946 |
| 2,409,551 | Donnellan | Oct. 15, 1946 |
| 2,426,635 | Mercier | Sept. 2, 1947 |